Jan. 31, 1956   H. FANTHAM ET AL   2,733,116
APPARATUS FOR MEASURING AND RECORDING
DECELERATION OF A VEHICLE
Filed Oct. 26, 1954
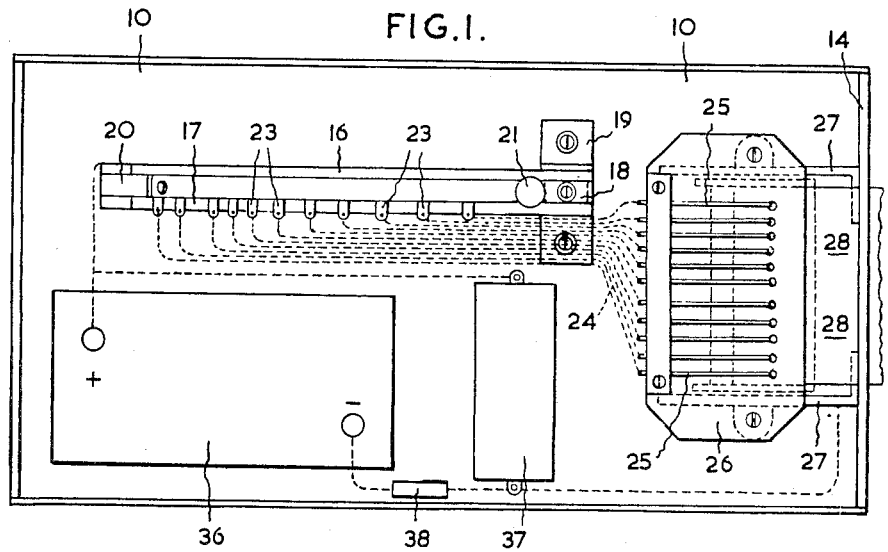
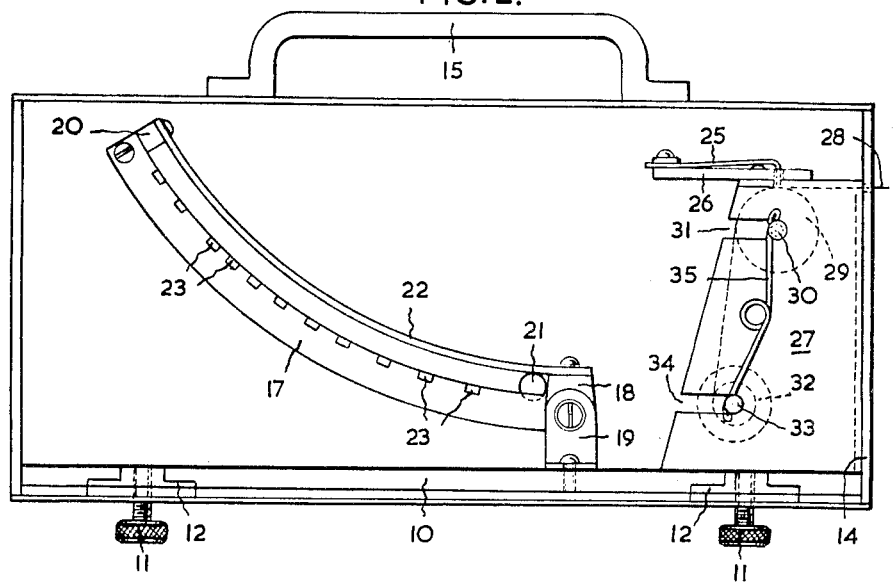
INVENTORS
HAROLD FANTHAM
CLARENCE HENRY JOHN DAFT
by Walter S. Hexton
ATTORNEY

United States Patent Office 2,733,116
Patented Jan. 31, 1956

2,733,116

APPARATUS FOR MEASURING AND RECORDING DECELERATION OF A VEHICLE

Harold Fantham and Clarence Henry John Daft, Birmingham, England, assignors to Girling Limited, Tyseley, Birmingham, England, a British company Application October 26, 1954, Serial No. 464,842

Claims priority, application Great Britain October 29, 1953

5 Claims. (Cl. 346—7)

This invention relates to apparatus for measuring and recording deceleration of a vehicle when the brakes are applied.

It is desirable that the efficiency of the brakes of a road vehicle should be checked at regular intervals, and one of the objects of our invention is to provide portable apparatus whereby a check can be readily made by an inspector or by the owner or driver of a vehicle and a permanent record obtained.

According to our invention apparatus for measuring and recording deceleration of a vehicle comprises two spaced parallel arcuate bars of which one is of metal and the other carries a series of angularly spaced insulated contact members, and an inertia member adapted to slide on the bars on deceleration of a vehicle in which the apparatus is placed and to connect the contact members successively to the metal bar as the inertia member passes the contact members which are individually connected electrically to means for recording on a record sheet or the like the engagement of each contact member by the inertia member and hence the arc of movement of the inertia member on the bars.

The arcuate bars conveniently subtend an angle of about 60° and are set in a vertical plane in such a position that the lower end of the bars is substantially horizontal. The lower ends of the bars may be secured to a pillar or bracket on a base provided with vertically adjustable feet so that the base can be set in a horizontal plane. The feet may be formed by levelling screws which are adjustably screwed through the base.

The contact members are conveniently connected individually to spaced resilient insulated fingers bearing on a paper strip overlying a metal drum or roller or other metal surface, and a battery and condenser are arranged in circuit with the arcuate metal bar and with the metal surface in such a manner that as the inertia member passes a contact member the condenser, which has been charged up by the battery, is discharged through the corresponding finger to the metal surface, and the discharge passing through the paper makes a hole in or burns a dot on the paper.

To use the apparatus the base is placed on the floor of a vehicle or on some other substantially horizontal surface with the arcuate bars extending forwardly.

When the vehicle is decelerated by application of the brakes the inertia member slides forwardly and upwardly on the arcuate bars and as it moves it engages successively the contact members on the second bar. The arc through which the inertia member travels and hence the number of contact members engaged depends on the rate of deceleration. As each contact member is engaged the circuit of the corresponding finger is closed and the condenser is discharged through the paper between the finger and the drum or roller to perforate the paper. The number of perforations gives a direct and permanent record of the rate of deceleration of the vehicle.

One practical form of our apparatus is illustrated diagrammatically by way of example in the accompanying drawings in which:

Figure 1 is a plan of the apparatus with the cover removed.

Figure 2 is a diagrammatic side elevation of the mechanism with the battery and condenser omitted.

In the apparatus illustrated the various parts are mounted on a base 10 provided with feet 11 formed by levelling screws which are adjustably screwed through sockets 12 fixed in the base so that when a test is being carried out the base can be set in a horizontal position on the floor of a vehicle which is not itself horizontal.

A vertical end wall 14 is fixed to one end of the base, and a cover including the opposite end wall, side walls, and a top is adapted to be detachably secured to the base to enclose the mechanism and is provided with a carrying handle 15.

An arcuate metal bar 16 and an arcuate bar 17 of insulating material parallel to and spaced from it are secured at their lower ends to a block 18 of insulating material mounted between two angle brackets 19 secured to the base. The upper ends of the bars are connected by a spacing block 20 of insulating material to which they are secured and which keeps them parallel.

The bars subtend an angle of approximately 60° and are set in such a position that their lower ends adjacent to the brackets 19 are substantially horizontal. A metal ball 21 of a diameter substantially greater than the spacing between the bars rests on the bars on which it is adapted to roll or slide under inertia forces and gravity.

A fibre or other strip 22 may be mounted above and concentric with the bars 16 and 17 to prevent the ball from escaping while permiting it to slide freely on the bars.

A number of angularly spaced metal contact members 23 are mounted on the insulating bar 17 for engagement by the ball 21, the arrangement being such that as the ball passes one of the contacts 23 it momentarily establishes an electric connection between that contact and the metal bar 16.

The contact members 23 are individually connected by leads 24 to a corresponding number of insulated resilient wire fingers 25 mounted on a horizontal plate 26 of insulating material fixed to the upper ends of a pair of spaced brackets 27 extending inwardly from the end wall 14. The free end of each finger is cranked downwardly and extends through a hole in the plate 26 into engagement with a strip of metallized paper 28 passing over the surface of a metal drum or roller 29. The roller is mounted on a spindle 30 of which the ends are rotatably received in slots 31 in the brackets 27. The paper as it leaves the drum 29 passes out through a slot in the end wall 14 and the paper is drawn off from a roll 32 on a spindle 33 rotatably mounted in slots 34 in the brackets 27. The spindles 30 and 33 are engaged by the free ends of wire springs 35 which normally hold them in the inner ends of the slots but permit the spindles to be readily removed from the slots for renewing the roll of paper.

A battery 36 is mounted on the base and one terminal of the battery is connected to the arcuate metal bar 16 and to one side of a condenser 37. The other terminal of the battery is connected through a resistance 38 to the other side of the condenser and to one of the brackets 27 with which the drum or roller 29 is in electrical contact.

When a test is in progress the inertia forces acting on the ball 21 when the vehicle is decelerated cause the ball to slide forwardly and upwardly on the bars 16 and 17 and the passage of the ball over each of the contact members 23 causes the discharge through the corresponding finger 25 to the metal drum or roller 29 of the condenser 37 which has been charged up by the battery 36. The passage of the discharge through the paper perforates the paper or burns a small dot on the paper and so provides a permanent record.

The number of holes or dots indicates the number of contact members over which the ball has passed and hence the rate of deceleration of the vehicle.

The positions of the contact members may be arranged to represent braking efficiencies of 20%, 30% and so on up to 100%, and graduations corresponding to these percentages may be printed on the paper strip.

After each test the paper on which the record has been made is withdrawn through the slot in the end wall and a fresh portion of the roll is thus drawn into position under the fingers 25.

Means operated by a handle or lever may be provided for rotating the drum or roller 29 step-by-step to feed the paper strip forward, and the position of the handle or lever may also control the electrical circuit.

In a modified arrangement the recording mechanism may be separate from the inertia contact mechanism so that the recording mechanism can be placed on the seat of a vehicle and the inertia mechanism on the floor. In that case the two parts of the apparatus will be connected by a cable which includes the individual leads between the contact members and the spring fingers and the lead connecting the condenser to the metal drum or roller. The cable may incorporate a multiple plug and socket coupling so that the two parts of the apparatus can be separated for convenience in transport.

We claim:

1. Apparatus for measuring and recording deceleration of a vehicle comprising a base, two spaced parallel arcuate bars mounted on said base in vertical planes and with their lower ends substantially horizontal, the remainder of each bar curving upwards from said lower end, the first of said bars being of metal, angularly spaced insulated contact members mounted on the second of said bars, an inertia member slidable on said bars on deceleration of a vehicle in which the apparatus is placed, a record sheet, and electrical means for marking on said record sheet the passage of the inertia member over each of said contact members to establish an electrical connection between said contact member and the arcuate metal bar.

2. Apparatus for measuring and recording deceleration of a vehicle comprising a base, two spaced parallel arcuate bars mounted on said base with their lower ends substantially horizontal, one of said bars being of metal, angularly spaced insulated contact members mounted on the second of said bars, an inertia member slidable on said bars on deceleration of a vehicle in which the apparatus is placed for momentarily establishing an electrical connection successively between individual contact members and the metal bar as the inertia member passes over a contact member, a battery, a condenser connected across said battery, an electrical connection between one terminal of said battery and said metal bar, a metal supporting surface, an electrical connection between the other terminal of said battery and said metal surface, a paper record sheet extending over said metal surface, and a number of spaced resilient insulated contact fingers bearing on said record sheet, said fingers being individually connected electrically to the individual contact members whereby the electrical connection of a contact member to the metal bar by the inertia member effects the discharge of the condenser from the corresponding finger to the metal surface through the record sheet to mark the record sheet.

3. Apparatus for measuring and recording deceleration of a vehicle as in claim 2 wherein said inertia member is a metal ball of a diameter greater than the spacing between said arcuate bars on which said ball is freely slidable under inertia forces.

4. Apparatus for measuring and recording deceleration of a vehicle as in claim 2 wherein said arcuate bars subtend an angle of approximately 60° and the contact members are mounted on the second bar in angularly spaced positions corresponding to the displacement of the inertia member effected by braking efficiencies of predetermined values.

5. Apparatus for measuring and recording deceleration of a vehicle as in claim 2 wherein said record sheet comprises a roll of metallized paper which is drawn off the roll between said metal surface and said resilient contact fingers.

References Cited in the file of this patent

UNITED STATES PATENTS

| | | |
|---|---|---|
| 636,685 | McGarvey | Nov. 7, 1899 |
| 2,411,165 | McBride | Nov. 19, 1946 |
| 2,641,457 | Carleton | June 9, 1953 |